D. W. HARRIS & E. P. CARTER.
CORN SHELLER.
No. 6,847. Patented Nov. 6, 1849.
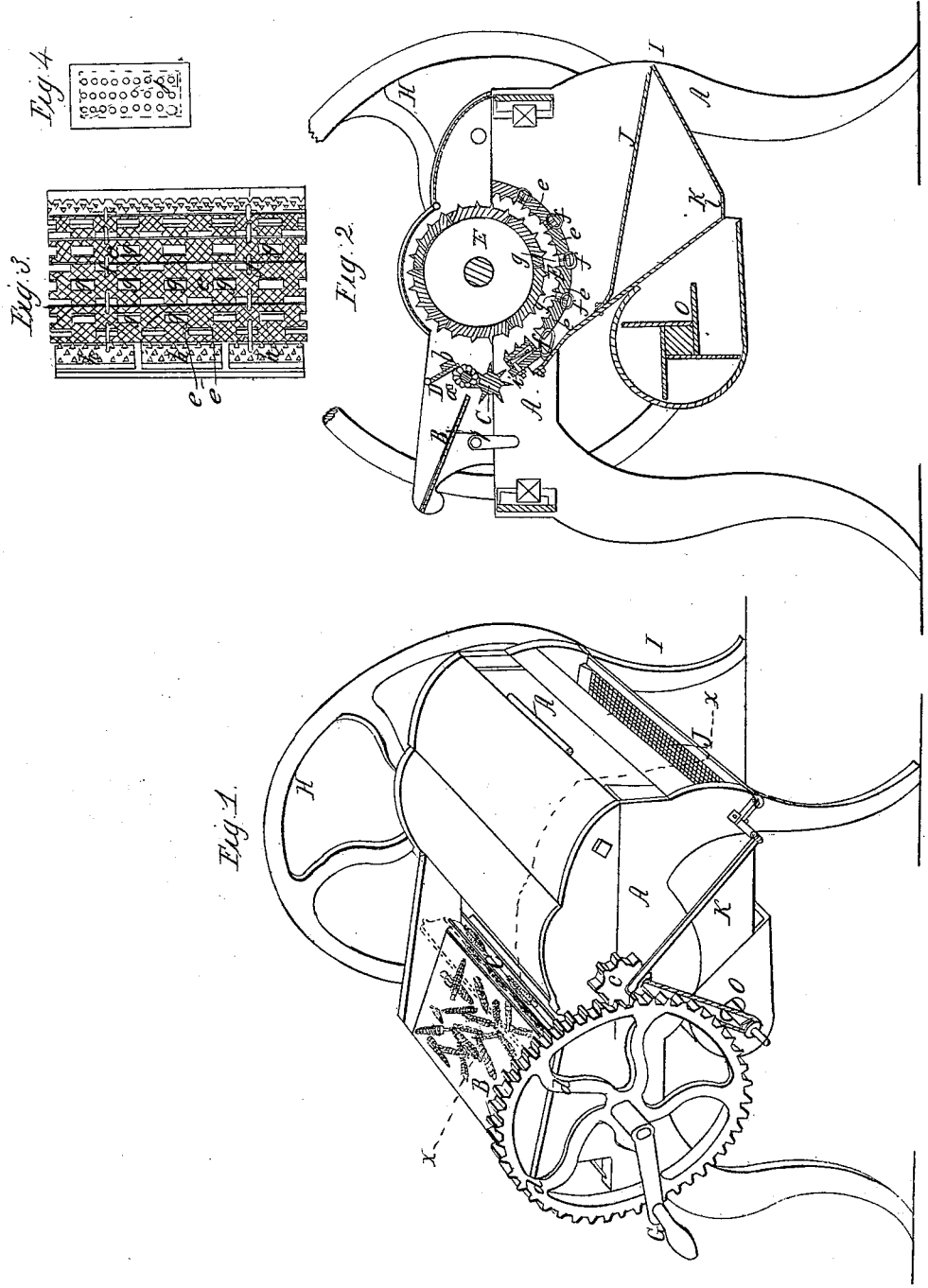

UNITED STATES PATENT OFFICE.

D. W. HARRIS AND E. P. CARTER, OF YORKSHIRE, NEW YORK, ASSIGNORS TO CARTER, HARRIS & CARTER.

CORN-SHELLER.

Specification of Letters Patent No. 6,847, dated November 6, 1849.

*To all whom it may concern:*

Be it known that we, DARIUS W. HARRIS and E. P. CARTER, of Yorkshire, in the county of Cattaraugus and State of New York, have invented certain new and useful Improvements in Corn-Shellers, of which the following is a full, clear, and exact description, reference being had to the accompanying drawing, forming part of this specification, in which—

Figure 1 is a perspective view of our corn sheller; Fig. 2 is a vertical cross section of the same at the line $x$ $x$ of Fig. 1; Fig. 3 is a plan of the concave; and Fig. 4 a plan of one of the spring sections of the same.

Our invention consists of a fluted feed roll by which the ears of corn are fed into the sheller with their axes always parallel to that of the cylinder; and in a peculiar construction of the concave by which the grains receive an oblique rub which detaches them more easily from the cob.

In the drawing A is the frame of our machine which we prefer to construct of cast iron fastened together with keys. To this is attached the inclined apron (B) on which the ears are thrown indiscriminately, at the foot of this apron is the fluted roll C, the flutes being sufficiently wide and deep to admit an ear of corn, the fluted roll revolves below a swinging gate D, hung from the sides of the frame by a pivot in the upper edge of each of its ends. The gate is prevented from swinging too far over the apron by a stop ($a$) attached to each side of the frame, and is pressed against these stops by a weight ($b$) attached to its opposite side. Beyond the feed roll C, is the toothed cylinder E, revolving in a toothed concave F, which is farthest from the cylinder at the point where the ears are delivered by the fluted roll and then gradually approaches it until at its opposite side the two are just far enough apart to receive between them a stripped cob. The cylinder has a pinion ($c$) on one extremity of its shaft which gears into a wheel ($d$) on the corresponding extremity of the shaft of the fluted roll, which is put in motion by power applied through a crank G, or other device.

The motion of the machine is regulated by a fly wheel H on the cylinder shaft. The concave is not formed of one solid piece, but is composed of segments $e$, $e$, $e$, hinged to each other by links $f$, $f$. It is also pierced with holes $g$, through which the shelled grain drops. That segment of the concave nearest the fluted roll is not like the others but is divided into several sections $h$, $h$, each hinged at one extremity to a flat bar $i$, which crosses the machine from side to side and to which the remaining segments of the concave are linked; each section is a shallow box containing within it a spring $j$ (fastened at one extremity to the bar) which tends to keep it in line with the flat bar ($i$) to which it is hinged, but which gives with the pressure of the corn under the action of the cylinder, and allows the section to oscillate on its pivot, thus by the combined action of the cylinder and this motion of the sections, ($h$, $h$) drawing the grains obliquely from the cob. The shelled corn drops through the concave upon an inclined vibrating screen J, where it is separated from any large fragments of the cob which may have been crushed by the cylinder, these are discharged at the front I, of the machine while the grains drop through the sieve and are received upon a funnel shaped bottom K, by which they are collected together and discharged at its apex $l$, through a current of air generated by a fan O, attached to the machine and driven by a belt from a pulley on the cylinder shaft, the blast separates all the chaff or light impurities, and the corn falls (from the machine) in a perfectly clean state.

To avoid complexity in description we have stated that but a single segment of the concave is divided into sections, but we divide more or less of the segments as is found most suitable to strip the cob most quickly of the grain.

What we claim as our invention and desire to secure by Letters Patent is—

1. Constructing one or more of the bars of the concave in hinged sections ($h$, $h$, $h$,) which turn in an arc whose axis is at right angles to that of the cylinder, whereby the ears are subjected to opposite and oblique rubs which facilitate the stripping of the grains from the cobs.

2. Feeding the corn into the throat of the sheller by means of a fluted roll (C) which delivers the ears with their axes parallel to that of the cylinder, whereby the breaking of the cobs is prevented and the shelling is expedited.

3. The employment of the hinged gate (D) to prevent the ears from being fed into the sheller either endwise or too rapidly.

In testimony whereof we have hereunto signed our names.

DARIUS W. HARRIS.
EGBERT P. CARTER.

Witnesses:
C. W. HANFORD,
A. W. MINER.